United States Patent [19]
Florentin et al.

[11] Patent Number: 6,052,965
[45] Date of Patent: Apr. 25, 2000

[54] WALL OR DOOR OF AN ENVIRONMENTAL CHAMBER

[75] Inventors: Jean-Michel Florentin, Soisson; Eric Villeminot, Chateau-Thierry; Stephane Margerand, Nanteuil-les-Meaux; Rene Poix, Noyon, all of France

[73] Assignee: Saint-Gobain Vitrage, Courbevoie, France

[21] Appl. No.: 09/058,953

[22] Filed: Apr. 13, 1998

[30] Foreign Application Priority Data

| Apr. 11, 1997 | [FR] | France | 97 04509 |
| Jul. 7, 1997 | [FR] | France | 97 08585 |
| Jul. 31, 1997 | [FR] | France | 97 09772 |

[51] Int. Cl.$^7$ .................. E04C 2/34; E04C 2/54
[52] U.S. Cl. .................. 52/786.13; 52/786.1
[58] Field of Search ............... 52/786.1, 786.13

[56] References Cited

U.S. PATENT DOCUMENTS

| Re. 35,120 | 12/1995 | Heaney | 52/786.1 X |
| Re. 35,392 | 12/1996 | Richardson et al. | 52/786.1 X |
| 5,497,586 | 3/1996 | Dodd et al. | 52/786.13 X |
| 5,657,607 | 8/1997 | Collins et al. | 52/786.13 |
| 5,794,404 | 8/1998 | Kim | 52/786.13 |
| 5,891,536 | 4/1999 | Collins et al. | 52/786.13 X |

*Primary Examiner*—Christopher T. Kent
*Attorney, Agent, or Firm*—Oblon, Spivak, McClelland, Maier & Neustadt, P.C.

[57] ABSTRACT

A door or wall of an environmental chamber and in particular a glazed door or wall includes an insulating panel. The insulating panel includes at least two glass substrates between which a vacuum has been created. The at least two glass substrates being separated from each other by mounts distributed over the entire surface of the at least two glass substrates. The at least two glass substrates joined together around their periphery by an inorganic seal.

25 Claims, 3 Drawing Sheets

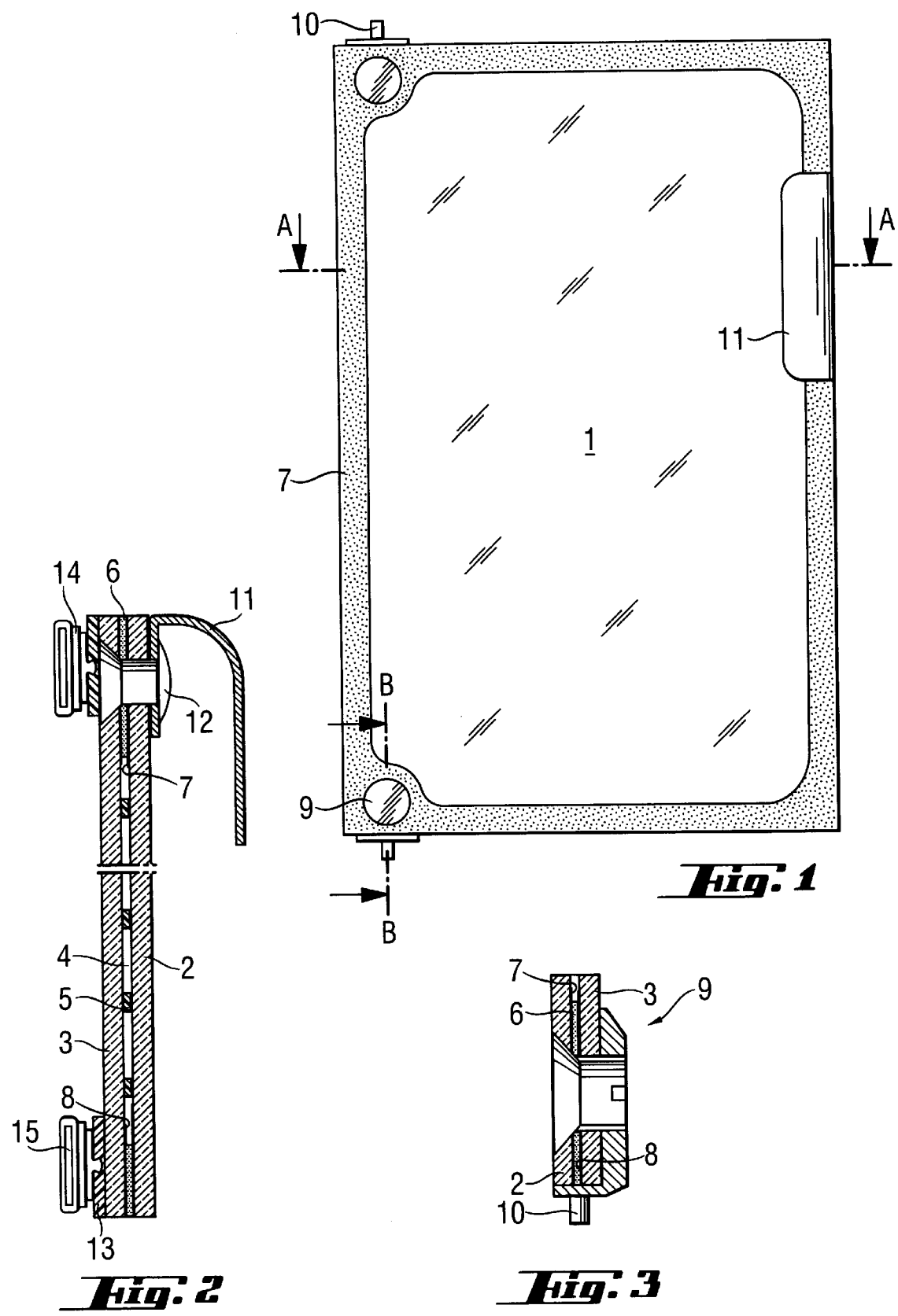

WALL OR DOOR OF AN ENVIRONMENTAL CHAMBER

BACKGROUND OF THE INVENTION

1. Field of the Invention

The present invention relates to a structure such as a door or wall of an environmental chamber and in particular a glazed door or wall.

The invention will be described more particularly for a door or wall of a refrigerated chamber in which cold or frozen products are displayed, but the invention is not limited to this type of chamber—any chamber with or without a hot humid environment also falls within the scope of the invention.

2. Discussion of the Background

When the products kept in a refrigerated chamber must remain visible, as is the case in many current commercial premises, the refrigerated chamber is equipped with glazed parts which transform it into a refrigerated "showcase," the common name for which is "refrigerated sales furniture." Many variants of these "showcases" exist. Some have the form of a cabinet, and then it is the door itself which is transparent, others constitute chests, and it is the horizontal lid which is glazed in order to allow the contents to be seen. While, yet others constitute counter-type showcases, and it is that part which separates the public from the merchandise which is glazed. Whatever the variant of these "showcases," it is also possible to produce glazed walls so that the entire content is visible from the outside.

The invention will be described more particularly for a door or wall of a refrigerated cabinet or chest.

In these types of display means, it is necessary for the merchandise to remain completely visible to customers so that it is possible to preselect the merchandise without opening the "showcase." Consequently, it is necessary to prevent the glazed parts of the "showcases" from becoming covered with condensation.

In order to prevent condensation, the method used generally consists in maintaining that face of the glazing assembly on the environment side at a temperature greater than the dew point of the atmosphere in question. This is achieved by increasing the insulation performance of the glazing assembly and, in addition, occasionally heating the face of the "warm" side. The simplest way of improving the thermal insulation performance of a single-pane glazing assembly is to replace it with a multi-pane glazing assembly. This technique is easy to implement in the case of cabinet-type showcases or in that of chest-type showcases, since the multi-pane glazing assemblies, consisting of two flat glass panels, mounted so as to be parallel to each other and separated by an air cavity or a gas-filled cavity, are easily fitted to the doors of cabinets or to the lids of chests. However, the use of such multi-pane glazing assemblies turns out not to be completely satisfactory from the thermal standpoint.

Several solutions have been envisaged for further improving the thermal insulation performance of these multi-pane glazing assemblies.

Thus, U.S. Pat. No. 4,382,177 relates to single-pane or double-pane glazing assemblies mounted in the doors of refrigerated cabinets or horizontal lids of chest-type freezers. The glazing assemblies are coated on their cold-side face with a film itself coated with a thin layer which reflects infrared radiation. By virtue of this thin layer, the insulation on the cold side is improved, the warm face is warmer and condensation occurs thereon at a higher water-vapor content of the ambient air. However, the improvement remains modest - the temperature rise is slight and the difference in moisture content of the atmospheres causing the condensation in both cases is low.

It is known to produce glazing assemblies consisting of 3 glass sheets, it being possible to replace one of the air cavities with a cavity filled with a gas such as krypton. These glazing assemblies have improved thermal insulation properties compared with the usual multi-pane glazing assemblies. However, these triple-pane glazing assemblies have a thickness such that there is a loss of transparency of approximately 25% compared with a monolithic glazing assembly. This reduction in visibility through the glazing assembly is further accentuated if at least one of the glass sheets is coated with a thin layer such as, for example, an infrared-reflective layer in order for the thermal losses through the glazing assembly to be significantly decreased. The loss of transparency is then such that it is necessary to increase the internal illumination of the chamber, thereby giving rise to an overall increase in the energy consumption of the environmental chamber.

It is also known to heat one face of a glazing assembly mounted in doors or walls of a refrigerated chamber above the temperature of the dew point of the "warm" ambient air. To do this, at least one of the glass sheets is coated on one of its faces with a thin conductive or semiconducting layer. There are numerous methods for depositing thin conductive or semiconducting layers on glass. In particular, several means are known which enable organic salts, which transform into conductive oxides, to be pyrolytically deposited on the hot glass. Among these, that of Patent EP-0, 125,153 allows continuous deposition of a thin layer based on fluorine-doped tin oxide on flat glass between the point where it leaves a "float" bath and where it enters the annealing lehr. This process makes it possible to obtain sheets of glass with a transparent and conductive layer of infinite dimensions for a low manufacturing cost. Such glazing assemblies coated in this way are generally heated continuously, especially if the temperature of the dew point of the "warm" ambient air is high. This continuous heating considerably increases the overall energy consumption of the refrigerated chamber.

Thus, U.S. Pat. No. 4,260,876 provides a heating control system applicable to refrigerated chambers. A system of sensors responds to the difference between the moisture content of the "warm," ambient atmosphere and the surface temperature of that part of the refrigerated chamber in question so as to control the heating energy consumption. However, such a system does not significantly decrease the overall energy consumption.

This is because, even if the heating is carried out intermittently, the heating times are generally longer than the non-heating times.

Moreover, whatever the approach envisaged by the manufacturer, it is usual to produce the glazed doors or walls from multi-pane glazing assemblies. Such glazing assemblies are very thick and heavy. Thus, because of their structure, it is necessary to fit them to a support frame which gives them good mechanical strength. In this way, these multi-pane glazing assemblies are bulky, which has repercussions on the structure and appearance of the chambers in which they are mounted.

SUMMARY OF THE INVENTION

The object of the invention is to produce a structure such as a door or wall of an environmental chamber which obviates the various drawbacks mentioned above, in particular a glazed door or wall which does not become covered with condensation, is compact and does not increase the energy consumption of the environmental chamber.

The invention thus provides a structure such as a door or wall of an environmental chamber such that it consists essentially of an insulating panel composed of at least two glass substrates between which a vacuum has been created, these being separated from each other by mounts distributed over the entire surface and being joined together around their periphery by an inorganic seal.

The invention therefore substitutes conventional insulating glazing assemblies with an insulating glazing assembly consisting of at least two glass substrates between which a vacuum has been created. This type of evacuated insulating glazing assembly has, for a smaller total thickness than that of the conventional insulating glazing assemblies, markedly improved thermal insulation properties.

Patent Application EP-A-0,645,516 describes an insulating glazing assembly composed of two glass sheets separated from each other by a small gap in which a vacuum has been created.

The glass sheets are separated from each other by mounts distributed over the entire surface and are joined together around their periphery by an inorganic seal. The structure of such a glazing assembly has the advantage of giving it a stiffness and strength which are equivalent to those of a monolithic glazing assembly of thickness equal to the sum of the thicknesses of the glass sheets, that is to say that the glass sheets behave like a single sheet, the thickness of which is the sum of that of the two glass sheets. In this way, it is no longer necessary to fit a support frame to this type of glazing assembly. Thus, the overall size is greatly reduced and mounting it into the environmental chamber is significantly simplified.

The invention will be described more particularly in the case of an evacuated insulating glazing assembly composed of two glass sheets, but it is not limited to this type of evacuated insulating glazing assembly. Any evacuated insulating glazing assembly such as, for example, one composed of a glass sheet and of a laminated panel also falls within the scope of the invention.

According to a preferred variant of the invention, at least one glass substrate of the insulating panel is coated with one or more functional layers on at least one of its faces. Such layers are, for example, low-emissivity layers such as those described in French Patent FR-2,701,474 or in French Patent FR-2,728,559. If a layer of this type is produced on an internal face of the glazing assembly, i.e., a face which subsequently is in contact with a vacuum, the invention preferably provides for the layer to be removed from the peripheral region of the surface corresponding to the region covered by the seal; this removal may allow better adhesion of the seal.

Advantageously, the light transmission $T_L$ of the insulating panel is greater than 64%, preferably greater than 70%, and the thermal factor K is less than 1 W/m².° K.

Preferably, the weight of the insulating panel is less than 25 kg/m² and the thermal factor K is less than 1 W/m².° K.

Table No. 1 below summarizes the characteristics of various types of insulating panel. These are, in order:

Insulating panel No. 1:
glass/PLANITHERM®/air/glass
Insulating panel No. 2:
glass/PLANITHERM® layer/air/glass/air/glass Insulating panel No. 3:
glass/PLANITHERM® layer/krypton/glass/krypton/glass
Insulating panel No. 4 (insulating panel according to the invention):
glass/PLANITHERM® layer/vacuum/glass with, as the PLANITHERM® layer, a thin vacuum-deposited silver-based layer consisting of the stack:

$SnO_2/ZnO/Ag/NiCr/Si_3N_4/SnO_2$

TABLE 1

| Insulating Panel | No. 1 | No. 2 | No. 3 | No. 4 |
|---|---|---|---|---|
| Thickness (mm) and number of glass sheets | 4 × 2 | 4 × 3 | 4 × 3 | 4 × 2 |
| Thickness (mm) and number of gas-filled cavities | 20 × 1 | 6.5 × 2 | 8 × 2 | — |
| Weight (kg/m²) | 20 | 30 | 30 | 20 |
| Total thickness of the panel (mm) | 28 | 25 | 28 | 8 |
| $T_L$ (%) (average value) | 76 | 69 | 69 | 76 |
| K(W/m² · °K) | 1.4 | 1.8 | 0.9 | 0.7 |

This table clearly shows the indubitable advantages of insulating panel No. 4, according to the invention.

In fact, for the same number of glass sheets and for the same light transmission index $T_L$, the thermal performance of insulating panel No. 4, according to the invention, is markedly superior, all the more so given that insulating panel No. 1 has a very thick air cavity.

Likewise, for a greater number of glass sheets (insulating panels No. 2 and No. 3), the thermal performance and light transmission are poorer than those of insulating panel No. 4, according to the invention, even in the presence of a rare gas such an krypton.

Moreover, insulating panel No. 3 clearly fulfils the thermal-performance and light-transmission conditions, but the difference in total thickness of the panel is more than 20 mm and the difference in weight more than 10 kg/m² compared with insulating panel No. 4. Thereby making use of insulating panel No. 3 as doors or walls of environmental chambers not very comfortable and not very attractive.

Table No. 2 below summarizes the characteristics of various types of insulating panels, the panels numbered 5 and 7 being known from the state of the art and already commercialized. They are given by way of comparative examples. These are, in order:

insulating panel No. 5:
glass/PLANITHERM® layer/air/EKO® layer/glass with, as the PLANITHERM® layer, a vacuum-deposited silver-based thin layer consisting of the stack: $SnO_2/ZnO/Ag/NiCr/Si_3N_4/SnO_2$ and, as the EKO® layer, a pyrolytically-deposited fluorine-doped $SnO_2$ layer;
insulating panel No. 6:
glass/EKO® layer/air/glass/air/glass with, as the EKO® layer, a layer identical to that of the insulating panel No. 5;
insulating panel No. 7:
glass/PLANITHERM® layer/krypton/glass/krypton/PLANITHERM® layer/glass with, as the PLANITHERM® layer, a vacuum-deposited silver-based thin layer consisting of the stack:

$SnO_2/NiCr/Ag/NiCr/SnO_2$;

insulating panel No. 4 (insulating panel according to the invention):

glass/PLANITHERM® layer/vacuum/glass with, as the PLANITHERM® layer, a layer identical to that of insulating panel No. 5.

TABLE 2

| Insulating Panel | No. 5 | No. 6 | No. 7 | No. 4 |
| --- | --- | --- | --- | --- |
| Thickness (mm) and number of glass sheets | 4 × 2 | 4 × 3 | 4 × 3 | 4 × 2 |
| Thickness (mm) and number of gas-filled cavities | 20 × 1 | 6.5 × 2 | 8 × 2 | — |
| Weight (kg/m$^2$) | 20 | 30 | 30 | 20 |
| Total thickness of the panel (mm) | 28 | 25 | 28 | 8 |
| TL (%) (average value) | 67 | 64 | 64 | 76 |
| K(W/m$^2$.°K) (average value) | 1.4 | 2 | 0.7 | 0.7 |
| Electrical power for demisting (W/m$^2$) | >100 | 140 | — | — |

This table clearly shows that:

for the same number of glass sheets and the same weight, insulating panel No. 4, according to the invention, gives significantly superior thermal performance for a total panel thickness significantly less than insulating panel No. 5, although the latter fulfills the light-transmission conditions.

Moreover, to be usable as a door or wall of an environmental chamber, insulating panel No. 5 must be heated on at least one face (in this case, by means of the EKO® layer) and consumes a demisting electrical power of more than 100 W/m$^2$;

insulating panel No. 6 fulfils none of the required conditions according to the invention and requires, in the case of its use as a door or wall of an environmental chamber, a demisting electrical power of approximately 140 W/m$^2$;

for an equivalent thermal factor which is less than 1, insulating panel No. 4, according to the invention, gives significantly superior light-transmission conditions than insulating panel No. 7, the latter being at the limit fixed by the invention. In addition, insulating panel No. 7 has a total thickness and a weight which are generally greater than those of the insulating panel No. 4, according to the invention; and none of the three insulating panels Nos. 5 to 7 known from the state of the art, which can be used as a door or wall of an environmental chamber, has all the advantageous characteristics of the insulating panel No. 4, according to the invention.

According to one embodiment of the invention, the insulating panel is provided on at least part of its external surface with at least one profile. By profile is understood to mean all types of profiles, prefabricated or produced directly on the insulating panel, having a shape tailored to the desired function of the profile and made of a material such as wood or aluminum or made of a plastic. Preferably, the profile is a plastic profile. Advantageously, the insulating panel is provided with a profile on at least its edge. In this way, the edge of the panel is protected from the various impacts which it may receive particularly when mounting it in the environmental chamber or when handling it in everyday use. Such a profile on at least part of the external surface of the insulating panel can fulfil various functions which will appear over the course of the description.

According to various embodiments of the invention, the profile is a profile which is adhesively bonded or extruded or overmolded by reaction injection molding or thermoplastic injection molding. The adhesively bonded profile, possibly, also being a profile prefabricated by extrusion or by injection molding. The usual techniques for depositing a plastic profile by extrusion or injection molding have been extensively described in many documents, for instance in European Patents EP-B-121,481 and EP-B-127,546. Advantageously, with the mechanical strength of these insulating panels being equivalent to a monolithic element, it is possible to apply the usual deposition techniques on these insulating panels without the risk of damaging or shattering them, even when it is necessary to apply high pressures.

Preferably, the insulating panel is provided with fastening elements and with accessories, such as hinges and handles if the function fulfilled by the insulating panel is that of a door, or such as nut-and-screw systems or snap-fastening systems if the function fulfilled is that of a wall.

According to one variant of the invention, the fastening elements and the accessories are fitted to the insulating panel via holes passing through the thickness of the latter. This embodiment has the advantage of producing an arrangement of the S.G. (Structural Glazing) type in which the fastening element is of a type which is flush with the external side of the environmental chamber. Thus, the insulating panel, once fastened, seems from the outside to be devoid of any "projecting" fastening element, this feature being particularly attractive.

According to another variant of the invention, the fastening elements and the accessories are adhesively bonded to the insulating panel. This embodiment has the advantage of providing either a bond directly to the glass or a bond to a plastic profile deposited beforehand in the relevant part of the insulating panel. The bond must have, after the adhesive has cured, particular characteristics such as, for example, a high shear strength. Preferably, the fastening elements and the accessories will be bonded using a silicone adhesive.

According to a third variant of the invention, the fastening elements and the accessories are inserted into a plastic profile. In this way, it is possible to position the fastening elements so that they are not visible from the outside of the chamber. For example, the fastening elements are positioned on the inside of the chamber near the seal, this feature being particularly attractive.

According to a preferred embodiment of the invention, the insulating panel is provided with heating elements on at least its periphery. In this way, the appearance of condensation around the border of the insulating panel is eliminated near the edge of the insulating panel, because of the seal creating a thermal bridge, forming a particularly sensitive area.

According to a variant of the invention, a heat tracing cable is embedded in the inorganic seal. This embodiment is advantageously attractive and easy to implement.

According to another variant of the invention, a heat tracing cable is placed around the periphery of the insulating panel in a plastic profile. This embodiment, which is easy to implement, has the advantage of being able to choose the peripheral region of the insulating panel which is directly heated. Preferably, the heat tracing cable is placed on the side wall of the panel facing the seal of the insulating panel when this seal is a conductive seal. In this way, the heat is transmitted to the two glass sheets by conduction through the seal.

According to a third variant of the invention, a conductive layer is deposited at least around the periphery on at least one of the faces of at least one of the glass substrates of the insulating panel. There are many methods for depositing conductive layers on glass.

According to one embodiment of the invention, the conductive layer is a layer based on a silver paste deposited by screen printing and, according to another embodiment of the invention, the conductive layer is a thin layer of metal oxide such as, for example, a pyrolytically deposited layer of fluorine-doped tin oxide.

Advantageously, the deposition of a thin layer around the periphery of one face of one of the glass substrates is followed by the deposition of a thin layer over most of one face of one of the glass substrates. Preferably, these two layers are independent of each other and are supplied by two different electrical circuits. In this way, the heating of the center of the insulating panel can be controlled using, for example, a sensor system so as to be used only when it is necessary, i.e., when condensation forms on the face in question, and without interfering with the peripheral heating.

Preferably, the insulating panel has, on its face turned towards the interior of the environmental chamber, seals placed opposite the jambs of the said environmental chamber.

Advantageously, when the insulating panel constitutes a door, the seals are magnetized or metallized, depending on the characteristics of the environmental chamber's jambs opposite them.

According to one embodiment of the invention, the seals are bonded to, extruded onto or encapsulated in the insulating panel directly.

According to another embodiment of the invention, the seals are bonded to, extruded onto, encapsulated in or clipped onto a plastic profile.

According to an advantageous variant of the invention, the insulating panel has at least one enamelled area on at least one of its faces.

In this way, the enamelled area makes it possible to improve the aesthetic appearance of the door or wall by acting as a "masking coat." Preferably, the enamelled area hides the seal and covers those areas of the insulating panel where the fastening elements and the accessories are to be incorporated into the insulating panel. Preferably, the two glass substrates each have the same area enamelled—the insulating panel, thus, has the same appearance from the side facing the interior of the environmental chamber and from the side facing the outside.

According to a variant of the invention, the structure such as a wall or door is mounted flush with the jambs of the environmental chamber, that is to say that the side walls of the insulating panel lie opposite the jambs of the environmental chamber.

According to another variant of the invention, the structure such as a wall or door is surface-mounted on the jambs of the environmental chamber, that is to say that the vertical edges of that face of the insulating panel which is turned towards the interior of the environmental chamber lie opposite the jambs of the said environmental chamber It is advantageous to use these types of mounting for several reasons. First of all, because of the small thickness of the insulating panel, the door or wall can be simply applied against the jambs of the environmental chamber without creating too great an additional thickness which would be unacceptable, if only from an aesthetic standpoint. Secondly, the structure of the insulating panel gives the door or wall such a rigidity and a sufficient strength that it is not necessary to fit the insulating panel in a support frame, as with the usual multi-pane glazing assemblies, which support frame would appreciably increase the overall size of the door or wall and, consequently, therefore that of the environmental chamber.

The structure such as a wall or door according to the invention makes it possible, as explained previously, to obtain better thermal insulation than the usual walls or doors, for a smaller thickness and lower weight, without increasing, indeed by decreasing, the overall energy consumption of the environmental chamber.

Advantageously, it is possible to provide a ventilation system in the environmental chamber such as, for example, a circulation of dry air so as to remove possible moisture. Preferably, dry air is made to circulate over the internal face of the insulating panel constituting the door so as to dry the internal face after each opening of the door. This preferred embodiment may be replaced by depositing a thin infrared-reflective layer, as described in U.S. Pat. No. 4,382,177.

BRIEF DESCRIPTION OF THE DRAWINGS

Further details and advantageous characteristics will emerge below from the description of embodiments of the invention with reference to the accompanying drawings, wherein:

FIG. 1 is a front view of a door of an environment chamber according to the invention;

FIG. 2 is a horizontal section on the axis A—A of FIG. 1;

FIG. 3 is a vertical section on the axis B—B of FIG. 1;

DESCRIPTION OF THE PREFERRED EMBODIMENTS

Figure 4:
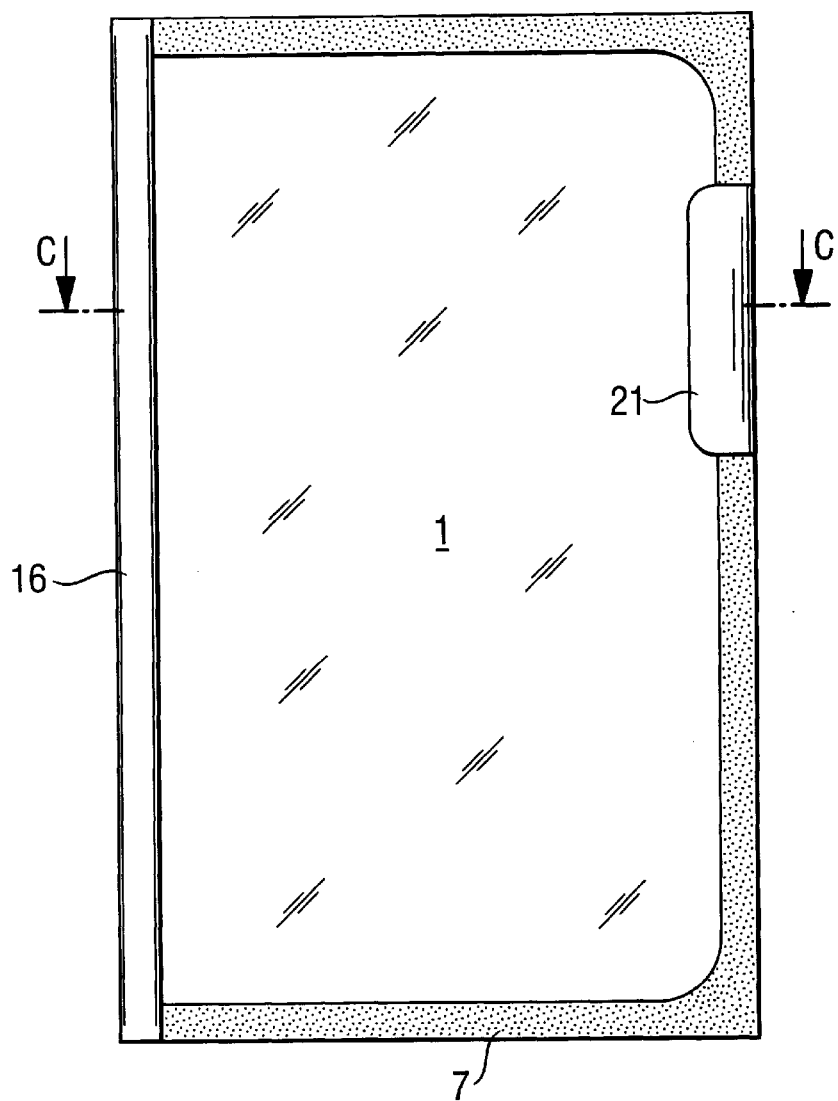
FIG. 4 is a front view of another type of door of an environmental chamber according to the invention.

First of all, it should be pointed out that, for the sake of clarity, all the figures do not strictly respect the proportions between the various elements shown.

Referring now to the drawings, wherein like reference numerals designate identical or corresponding parts throughout the several views, and more particularly to FIG. 1 thereof, a wall or door of an environmental chamber has been created. The insulating panel 1 consists of two glass sheets 2 and 3 between which a vacuum 4 has been created, these being separated from each other by mounts 5 distributed over the entire surface and being joined together around their periphery by an inorganic seal 6.

According to this representation, the glass sheet 2 is coated around the border of its internal face with an enamel layer 7 deposited by screen printing so that at least the inorganic seal 6 cannot be seen from outside the insulating panel 1. The glass sheet 3 is coated around the border of its internal face with a conductive or semiconducting thin metallic layer 8 deposited, for example, using a pyrolytic deposition technique.

This thin metallic layer 8 is connected to an electrical circuit via any means known to those skilled in the art, and not shown in the figures. Preferably, this thin metallic layer 8 is a layer based on a metal oxide, such as fluorine-doped tin oxide, and has a geometrical thickness of between 180 and 350 nm and a surface resistance of less than or equal to 50 ohms per square millimeter and preferably less than or equal to 20 ohms per square millimeter.

The mounts 5 have a thickness of 0.2 millimeters and a diameter of 0.4 millimeters. They are distributed over the entire surface of the glass sheets 2 and 3 and are separated from one another by 30 millimeters.

The mounts 5 are deposited on one of the glass sheets 2 and 3 after the latter have been coated with their respective layers 7 and 8, drilled separately, if necessary, in order to form a hole, and then toughened. After depositing a bead of glass frit around the periphery of the second glass sheet and around the holes, if this sheet is provided therewith, the two glass sheets 2 and 3 are assembled and then a heat treatment is carried out on the assembly in order to weld the two glass sheets 2 and 3 together, the seal 6 then sealing the assembly. A vacuum is then created between the two glass sheets 2 and 3 using any means known to those skilled in the art, such as, for example, the process described in the French Patent Application filed in the name of Saint-Gobain Vitrage under the number 96/09632. The insulating panel 1 is then ready to be fitted with its various elements so as to form a door or wall according to the invention.

FIGS. 1, 2 and 3 show a first type of embodiment of a door according to the invention.

According to this embodiment, the insulating panel 1 is drilled at three points. Two of the three holes produced in the insulating panel 1 are each intended to accommodate a fastening element 9 and are positioned on each side of the insulating panel 1 near one of the vertical edges.

One of these fastening elements 9 is shown in detail in FIG. 3. This fastening element 9 consists of several elements which interact so that it forms part of a hinge assembly. The female element 10 of which projects from the insulating panel 1 near its lower side wall and its upper side wall. By lower and upper side walls are meant the side walls of the insulating panel 1 which face respectively the bottom and top when the insulating panel 1 is in a vertical plane. Thus, the two female elements 10 of the fastening elements 9 lie in the same plane and define the axis of rotation of the door according to the invention. The fastening elements 9 are mounted so as to be flush with that face of the insulating panel 1 which is turned towards the outside of the environmental chamber, so that there is no fastening element projecting from this face.

The third hole made in the insulating panel 1 is intended for fitting a door handle 11 using a nut-and-bolt system 12 passing through the insulating panel 1 and mounted so as to be flush with that face of the insulating panel 1 which is turned towards the interior of the environmental chamber.

The insulating panel 1 is provided with a plastic profile 13 around the periphery of the glass sheet 3 on its face turned towards the interior of the environmental chamber.

The profile 13 may be adhesively bonded or may be extruded or encapsulated. Whatever the technique used to deposit this profile 13, it is shaped in such a way that a seal 14 can be clipped on top of it. The seal 14, near its part in contact with the structure of the environmental chamber, is provided with magnets 15 enabling the door according to the invention to be held in the closed position.

Figure 5:
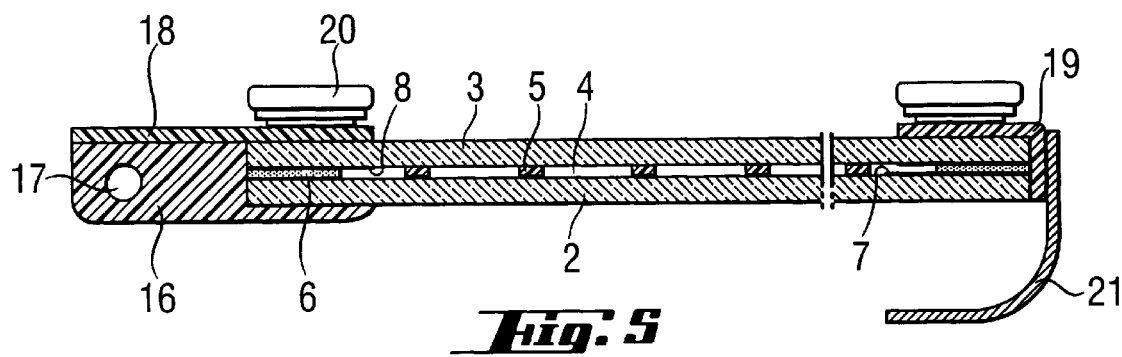
FIG. 5 is a horizontal section on the axis C—C of FIG. 4.

FIGS. 4 and 5 show a second type of embodiment of a door according to the invention.

According to this embodiment, the insulating panel 1 in provided along one of its vertical edges with a plastic profile 16. Profile 16 covering the edge and the periphery of the glass sheet 2. The profile 16 may either be bonded or extruded or encapsulated. Whatever the technique used to deposit this profile 16, there is advantageously an additional thickness of material near the side wall of the insulating panel, this part of the profile having a slot 17 over its entire length so that a fastening element, such as an element of a hinge system, can be inserted thereinto. In this way, the hole 17 defines the axis of rotation of the door according to the invention. Advantageously, by virtue of the presence of the profile 16 along one of the side walls of the insulating panel 1, the enamel layer 7 can be deposited only along the other three sides of the insulating panel 1, the profile 16 itself then masking the seal 6.

Moreover, the insulating panel 1, thus fitted with the profile 16, has a plastic profile 18 covering the edge of the profile 16 which is adjacent to the glass sheet 3 and the edge of the glass sheet 3, and a plastic profile 19 covering the periphery and the edge of the glass sheet 3 along the other three sides of the insulating panel 1. These two profiles 18 and 19 may also be bonded, extruded or encapsulated. Those parts of the profiles 18 and 19 which cover the periphery of the glass sheet 3 are provided with a magnetized seal 20. The seal 20 is bonded, extruded or encapsulated, as desired.

The insulating panel 1 is fitted with a door handle 21 adhesively bonded to the plastic profile 19 in the peripheral region of the insulating panel 1 on the side opposite the profile 16.

Figure 6:
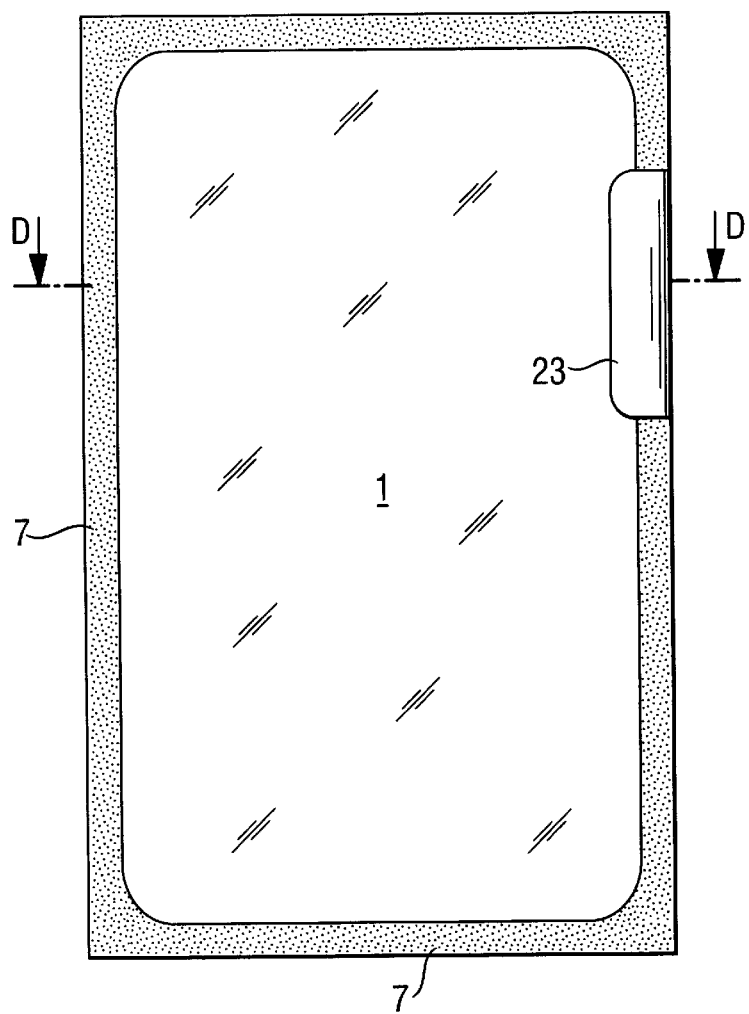
FIG. 6 is a front view of a third type of door of an environmental chamber according to the invention.
Figure 7:
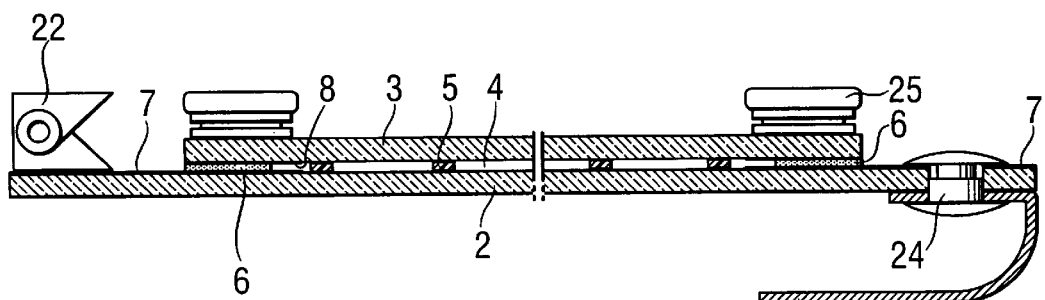
FIG. 7 is a horizontal section on the axis D—D of FIG. 6.

FIGS. 6 and 7 show a third type of embodiment of a door according to the invention.

According to this embodiment, the glass sheet 3 is narrower than the glass sheet 2 and is centered with respect to the latter. The enamel layer 7 deposited on the glass sheet 2 covers the periphery of the latter so that the difference in geometry between the two glass sheets 2 and 3 is not visible from the sheet 2 side.

Because the glass sheet 3 is centered with respect to the glass sheet 2, the insulating panel 1 may be provided, on each side, with fastening elements such as hinges 22 and with accessories such as a door handle 23 on the projecting edges of the glass sheet 2. Advantageously, the hinges 22 are adhesively bonded to the internal face of the glass sheet 2 so that they cannot be seen from outside the insulating panel 1. The door handle 23 can be easily fitted by means of a nut-and-bolt system 24 passing through the glass sheet 2.

The glass sheet 3 is provided around its periphery with a magnetized seal 25 which can either be bonded to, extruded onto or encapsulated in the glass sheet 3 directly.

The various types of door, thus, described are easy to produce and to fit. They provide thermal insulation which is beyond question, while still being particularly attractive The invention is not limited to these types of embodiment and must be interpreted in a non-limiting manner as encompassing any type of door of an environmental chamber, the door essentially consisting of an evacuated insulating panel.

Likewise, the invention is not limited to doors or horizontal lids of environmental chambers, any type of fixed or sliding wall also falling within the scope of the invention.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A structure comprising:
    at least two glass substrates;
    mounts distributed over an internal face of each of said at least two glass substrates so as to separate each of said at least two glass substrates;
    an inorganic seal joining together peripheries of said at least two glass substrates, wherein a vacuum is formed between said at least two glass substrates, said at least two glass substrates, mounts and said inorganic seal forming an insulating panel; and at least one heating element provided along at least a periphery of said insulating panel.

2. A structure according to claim 1, wherein the structure forms a door of an environmental chamber.

3. A structure according to claim 2, wherein the structure forms a wall of an environmental chamber.

4. A structure according to claim 1, wherein at least one of said at least two glass substrates is coated with a low-emissivity layer on at least one of said internal faces.

5. A structure according to claim 1, wherein light transmission of the structure is greater than 64%, and the thermal factor is less than 1 W/m$^2$.° K.

6. A structure according to claim 1, wherein light transmission of the structure is greater than 70%, and the thermal factor is less than 1 W/m$^2$.° K.

7. A structure according to claim 1, wherein a weight of the structure is less than 25 kg/m$^2$, and the thermal factor is less than 1 W/m$^2$.° K.

8. A structure according to claim 2, wherein a weight of said door is less than 25 kg/m$^2$, and the thermal factor is less than 1 W/m$^2$.° K.

9. A structure according to claim 3, wherein a weight of said wall is less than 25 kg/m$^2$, and the thermal factor is less than 1 W/m$^2$.° K.

10. A structure according to claim 1, wherein said at least two glass substrates, mounts and said inorganic seal form an insulating panel, and further comprising at least one profile provided on at least part of an external surface of said insulating panel.

11. A structure according to claim 10, wherein said profile is made of plastic.

12. A structure according to claim 10, wherein said profile is adhesively bonded.

13. A structure according to claim 10, wherein said profile is an extruded profile.

14. A structure according to claim 10, wherein said profile is an overmolded plastic profile obtained by reaction injection molding or thermoplastic injection molding.

15. A structure according to claim 1, wherein said at least two glass substrates, mounts and said inorganic seal form an insulating panel, and wherein said insulating panel is provided with fastening elements and with accessories.

16. A structure according to claim 15, wherein said fastening elements and said accessories are adhesively bonded to said insulating panel.

17. A structure according to claim 1, further comprising a conductive layer deposited at least around a periphery on at least one face of at least one of said at least two glass substrates.

18. A structure according to claim 1, wherein said at least two glass substrates, mounts and said inorganic seal form an insulating panel, and wherein the insulating panel has seals on its face that are intended to be positioned opposite jambs of an environmental chamber.

19. A structure according to claim 18, wherein said seals are bonded to, extruded onto or encapsulated in said insulating panel.

20. A structure according to claim 18, further comprising at least one profile provided on at least part of an external surface of said insulating panel, and wherein said seals are bonded to, extruded onto, encapsulated in or clipped onto a periphery of said at least one profile.

21. A structure according to claim 1, wherein said at least two glass substrates, mounts and said inorganic seal form an insulating panel, and wherein said insulating panel has at least one enamelled area on at least one of its faces.

22. A structure comprising:

at least two glass substrates;

mounts distributed over an internal face of each of said at least two glass substrates so as to separate each of said at least two glass substrates; and an inorganic seal joining together peripheries of said at least two glass substrates, wherein a vacuum is formed between said at least two glass substrates, wherein said at least two glass substrates, mounts and said inorganic seal form an insulating panel, said insulating panel is provided with fastening elements and with accessories, and said fastening elements and said accessories are fitted to said insulating panel via holes passing through a thickness of said insulating panel.

23. A structure comprising:

at least two glass substrates;

mounts distributed over an internal face of each of said at least two glass substrates so as to separate each of said at least two glass substrates;

an inorganic seal joining together peripheries of said at least two glass substrates, wherein a vacuum is formed between said at least two glass substrate, said at least two glass substrates, mounts and said organic seal form an insulating panel; and at least one profile provided on at least part of an external surface of said insulating panel, wherein:

said insulating panel is provided with fastening elements and with accessories, and said fastening elements and said accessories are inserted into said at least one profile.

24. A structure comprising:

at least two glass substrates;

mounts distributed over an internal face of each of said at least two glass substrates so as to separate each of said at least two glass substrates;

an inorganic seal joining together peripheries of said at least two glass substrates, wherein a vacuum is formed between said at least two glass substrates; and a heat tracing cable embedded in said inorganic seal.

25. A structure comprising:

at least two glass substrates;

mounts distributed over an internal face of each of said at least two glass substrates so as to separate each of said at least two glass substrates;

an inorganic seal joining together peripheries of said at least two glass substrates, wherein a vacuum is formed between said at least two glass substrates, said at least two glass substrates, mounts and said inorganic seal form an insulating panel;

at least one profile provided on at least part of an external surface of said insulating panel; and a heat tracing cable located around a periphery of said profile.

* * * * *